United States Patent [19]
Oesterle et al.

[11] Patent Number: 5,656,140
[45] Date of Patent: Aug. 12, 1997

[54] ELECTROCHEMICAL RECLAMATION OF HEAVY METALS FROM NATURAL MATERIALS SUCH AS SOIL

[75] Inventors: John H. Oesterle, Oakwood; Kenneth D. Hughes, Marietta, both of Ga.

[73] Assignee: Chamberlain Ltd., Inc., Ooltewah, Tenn.

[21] Appl. No.: 496,028

[22] Filed: Jun. 28, 1995

[51] Int. Cl.⁶ .................................................. C25F 7/00
[52] U.S. Cl. .................... 204/234; 204/237; 204/260; 204/263; 204/272; 204/275
[58] Field of Search .................... 204/234, 237, 204/260, 263, 275, 252, 272

[56] References Cited

U.S. PATENT DOCUMENTS

| | | | |
|---|---|---|---|
| 3,703,453 | 11/1972 | Gordy et al. | 588/204 |
| 3,748,240 | 7/1973 | Johnson et al. | 588/237 |
| 3,899,405 | 8/1975 | Iverson et al. | 588/204 |
| 3,970,531 | 7/1976 | Recht | 588/204 |
| 4,014,766 | 3/1977 | Watanabe et al. | 205/746 |
| 4,204,922 | 5/1980 | Fraser | 205/352 |
| 4,226,685 | 10/1980 | Portal et al. | 205/348 |
| 4,269,690 | 5/1981 | Graham | 204/272 |
| 4,318,789 | 3/1982 | Marcantonio | 588/237 |
| 4,517,064 | 5/1985 | Cook | 205/576 |
| 4,525,253 | 6/1985 | Hayes | 210/748 |
| 5,302,287 | 4/1994 | Losack | 210/612 |
| 5,391,268 | 2/1995 | Kaczur | 205/553 |
| 5,405,509 | 4/1995 | Lomasney et al. | 205/688 |
| 5,486,272 | 1/1996 | Hemsley | 205/77 |

FOREIGN PATENT DOCUMENTS

WO92/14865  9/1992  Australia.

*Primary Examiner*—John Niebling
*Assistant Examiner*—Brendan Mee
*Attorney, Agent, or Firm*—Frank H. Foster; Kremblas, Foster, Millard & Pollick

[57] ABSTRACT

An electrochemical remediation apparatus comprising a cylindrical tank having a plurality of vertical anodes suspended downwardly from a dome-shaped lid and positioned around the circumference of the tank spaced radially inwardly from the inner sidewalls of the tank. A single cathode is positioned at the axis of the cylindrical tank and removably mounted to the lid. A cylindrical metal ion permeable membrane is positioned between the anodes and the cathode. A plurality of nozzles spaced circumferentially around the tank directs pressurized fluid into the tank at a direction having radial, axial and circumferential components. A mixture of water, acid and contaminated earth consisting of approximately 50% contaminated earth is poured into the region between the membrane and the tank sidewalls. The mixture is incubated and fluidized, and contact between metals in the mixture and the anodes causes the metal contaminants to act as sacrificial anodes and thereby to ionize. The metal cations are electrostatically attracted to the central cathode and deposit thereon.

17 Claims, 5 Drawing Sheets

ELECTROCHEMICAL RECLAMATION OF HEAVY METALS FROM NATURAL MATERIALS SUCH AS SOIL

TECHNICAL FIELD

This invention involves a method and apparatus for removing chemical species from soils, sediments and other natural materials, and more specifically involves removing metal species using electrochemical technology.

BACKGROUND ART

Pollution by various contaminants of different parts of the environment and the existence in low volumes of valuable metals have caused a variety of chemical removal techniques to be developed. These techniques differ based upon the chemical specie to be removed and the environment from which it is to be removed. For example, the techniques used for the removal of metallic elements from waste water are different from the treatment of inorganic, contaminated soils primarily because of the presence of insoluble, abrasive particles to which the inorganic materials are absorbed or adsorbed.

In the treatment of waste water, two techniques which are conventionally used are metal plating and insoluble precipitate formation. In the metal plating method, an anode and a cathode are placed in the waste water, connected to a DC source and an electric field is created between the electrodes. Certain ions already existing in the water are attracted toward one electrode, and deposit onto that electrode after migrating through the highly viscous waste water. In the precipitate formation method, a cathode and an anode are placed in the waste water and an acid insoluble precipitate is formed at one of the two electrodes. The precipitate is collected and removed from the system by filtration. Patents describing these techniques include U.S. Pat. No. 4,226,685 to Portal et al. and U.S. Pat. No. 3,703,453 to Gordy et al.

Another technique for treating waste water and organic sludge is based upon fluidized bed technology. Anodes and cathodes are placed in waste water, the cathode is in electrical contact with metallized particles in the waste water. An ion permeable membrane separates the anodes from the cathodes. The metallized particles increase the effective surface area of the cathode, and the metal is plated from ions already existing in the solution onto the metallized particles. The metal particles are subsequently removed from the waste water by filtration. Patents describing this technology include U.S. Pat. No. 3,970,531 to Recht and U.S. Pat. No. 3,899,405 to Iverson et al.

A fourth method of removing heavy metals from waste water involves the use of sacrificial electrodes in which insoluble heavy metal precipitates are formed during the dissolution of one electrode and are filtered from the water based system. Patents describing this technology include U.S. Pat. No. 4,318,789 to Marcantonio, U.S. Pat. No. 4,014,766 to Watanabe et al. and U.S. Pat. No. 3,748,240 to Johnson et al.

Losack, in U.S. Pat. No. 5,302,287, teaches to use detergents and nutrients for microorganism growth, and to separate the contaminated soil and water. U.S. Pat. No. 5,405,509 to Lomasney et al. describes an in-situ technique in which metal ions migrate through soil in response to an electric field between a cathode and an anode buried in the soil. These metal ions are entrapped in an ion trapping material or concentrated in the soil near one electrode. The movement of the ions in the soil is substantially slower than the movement of ions in waste water. Furthermore, many methods for in-situ electric field migration of metal ions only concentrate the metal ions in the soil near one of the electrodes, requiring subsequent removal and treatment of the soil.

None of the above described techniques provide for rapidly and efficiently removing heavy metals or other such chemical species from soils which contain matter such as rocks and sand. The waste water treatment techniques, which are relatively rapid, cannot easily be converted to the treatment of soils containing rocks, sand and clay, since the flow of metal ions is substantially slower in the two environments, and since the highly abrasive inorganic matter would cause problems when used with a waste water treatment system. Additionally, waste water ion removal involves removal of existing ions, not the ionization and then the subsequent removal of compounds and other metals in ionic form. Furthermore, many waste water treatment systems use filtration of precipitates or metallized particles onto which the pollutants are plated. The filtration of the precipitate or the metallized particles becomes extremely difficult when rocks and sand exist in the mixture to be remediated, since a filter cannot discriminate between similarly sized particles which should stay in the soil (such as rocks) and particles which should be removed (such as the precipitates). Furthermore, the highly abrasive sand and other inorganic particles tend to abrade and wear metal pieces off the metallized particles and allow the metal pieces to remain in the system, defeating the removal of metallic pollutants from the system.

Therefore, the need exists for a technique for removing metal pollutants from natural materials, such as soil, which does not involve filtration, and which provides rapid, efficient removal of the metal pollutants.

BRIEF DISCLOSURE OF INVENTION

A method is disclosed for removing metallic contaminants and other chemicals from natural materials such as contaminated earth, and the method comprises three steps. A first step includes mixing water, acid, and earth (containing soil, rocks, sand, clay, etc.) in a container to form a mixture. The container has a cathode and an anode positioned in the mixture. A second step includes circulating the mixture in a manner that allows intimate contact of the mixture with the anode. A third step includes applying a voltage to the anode and cathode to ionize metal contaminants and deposit the metal ions on the cathode.

A remediation apparatus is also disclosed for removing chemicals such as metallic contaminants. The apparatus comprises a container for containing a mixture of water, acid and earth. A circulator fluidizes the mixture in a flow path within the container. A positively charged anode is positioned in the flow path of the suspended mixture within the container. A negatively charged cathode is also positioned in the container.

The invention also contemplates a metal ion permeable membrane positioned in the container between the anode and the cathode. The invention further contemplates a recirculating pump which circulates the mixture along the flow path. A drainage outlet, which is connected to the pump at a first end, communicates with the interior of the container at a second end. A nozzle-like inlet, which is connected to the pump at a first end and which communicates with the interior of the container at a second end, serves as a conduit for reintroducing the withdrawn mixture into the container.

Figure 1:
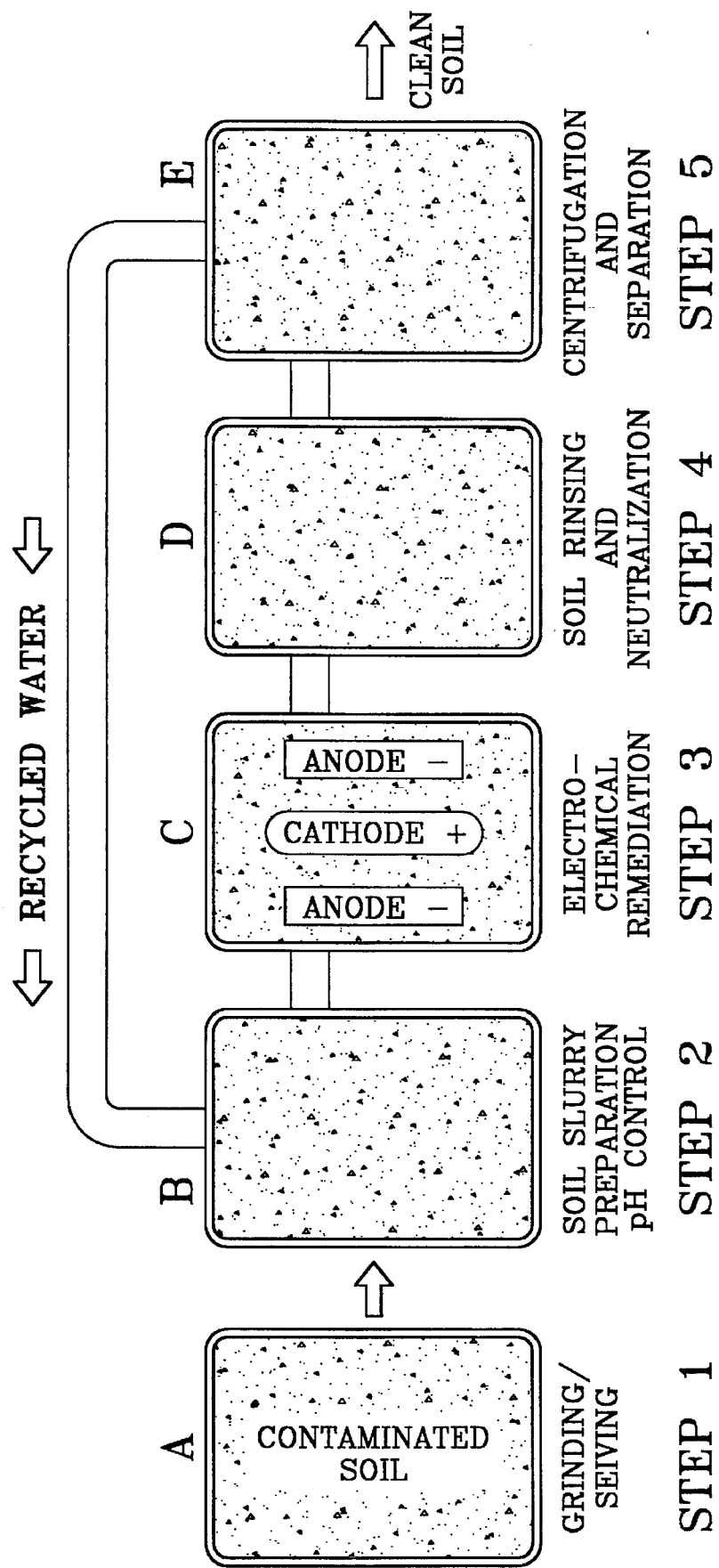
FIG. 1 is a flow chart illustrating the preferred steps of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates the multiple stages of the preferred process of the present invention which is a batch process. A preferred first step in the batch process includes removing natural materials, such as contaminated earth, with earth moving equipment and depositing it into a pulverizer A. In this description, the term "earth" refers to matter removed from the ground which is normally a part of the surface of the earth. This matter typically includes organic compounds, sands, clays, rocks, soils, sediment and other matter commonly found with these compounds. The term "contaminated" refers to earth containing some target chemical species that are desired to be removed. In the pulverizer A, the contaminated earth is ground with a hammer mill or other suitable size reduction device, and sieved to remove large rocks and other objects which will interfere with the subsequent steps.

The earth is then conveyed into a container B into which water, acid (preferably hydrochloric) and recycled water are mixed to form a slurry-like mixture having a predetermined pH value. The proportions of earth to chemically modified liquid is about one to one but may be varied substantially to still maintain fluid-like characteristics of the mixture. Instead of an acid, a basic (caustic) material could be added. In general, it is possible to use any interfacial modifier (e.g. acid, base or chelating agent).

Once the slurry-like mixture has been formed, it is conveyed to container C which is where the electrochemical remediation of the earth occurs. It is in the container C where heavy metals clinging to soil, clay and rock particles and heavy metal particles circulating in the mixture are removed. The process in the container C is the subject of further description below.

The mixture is conveyed from container C to container D in which the earth is rinsed and the pH is adjusted, bringing it closer to 7 (neutral). The mixture is next conveyed to container E, which is a centrifuge, in which the earth and liquid are separated. The liquid removed from the mixture is recycled back to container B and the clean solid material is taken from the container E and placed back into the environment from which it was removed in the first step.

The steps preceding and subsequent to container C are not themselves new and are well known in the art. Therefore, only a description of the electrochemical remediation which occurs in container C will be given, and no substantial explanation of the steps precedent and subsequent to it will be given since they are understood by those skilled in the art.

Figure 2:
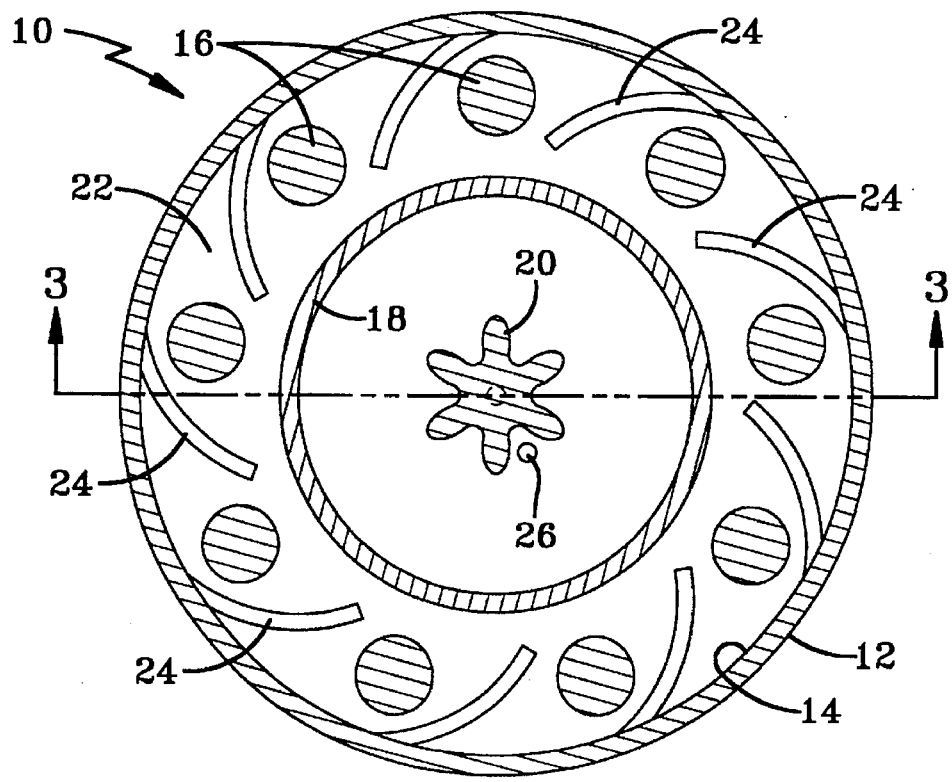
FIG. 2 is a top view in section illustrating the preferred electrochemical remediation tank.

FIG. 2 is an overhead view in section illustrating the preferred electrochemical remediation apparatus 10 shown as container C in FIG. 1. The apparatus 10 includes a tank 12 having cylindrical interior sidewalls 14 and dome-shaped top and bottom. Spaced radially inwardly of the cylindrical sidewalls 14 are multiple anodes 16. The anodes 16 are preferably spaced equidistant from the axis of the cylindrical sidewalls 14 and equidistant from every other anode positioned circumferentially around the tank 12 near sidewalls 14. The anodes 16 are vertically mounted cylindrical rods extending parallel to the sidewalls 14. In the preferred embodiment, the anodes 16 are rigidly mounted to a tank lid (not shown) which rigidly removably fastens to the top of tank 12.

A selectively permeable membrane 18 is spaced radially inwardly of the anodes 16. The membrane 18 is preferably a hollow cylinder coaxial with the tank sidewalls 14. The membrane 18 permits particles smaller than a predetermined size through the membrane, and in the preferred embodiment the predetermined size is the size of metal ions which are to be removed from the mixture.

A cathode 20 is positioned coaxially with the cylindrical interior walls 14. The cathode 20 has an exterior contour designed to increase surface area over that obtained with a cylinder of equal diameter to cathode 20. This increased surface area provides greater surface area on which metal ions can be deposited, permitting a smaller overall diameter cathode for the surface area desired. The increased surface area is obtained by a plurality of longitudinal grooves formed in the cathode's outer surface parallel to the cathode's axis. This forms a spline shaft type configuration giving, for example, a cathode of outer diameter of 12 inches the surface area of a cylinder of 24" diameter.

The earth, water and acid mixture poured into the tank 12 for electrochemical remediation is poured into the region 22 between the membrane 18 and the tank interior sidewalls 14. In order to circulate the mixture, a plurality of nozzles 24 positioned around the circumference of, and attached to the sidewalls 14 of, the tank 12 direct fluid into the tank 12, causing motion of the mixture. A drainage outlet 26 formed in the bottom of tank 12 near the cathode 20 permits removal of a portion of the mixture to be reintroduced into the tank 12 through the nozzles 24. Positioning outlet 26 inside membrane 18 ensures a minimal amount of large objects near the outlet 26 to possibly block it since the membrane 18 will not allow them through. Of course, many other fluids such as air or inert gas could be used to circulate the mixture. A conventional pump 50 withdraws the mixture through outlet 26 and reintroduces it through nozzles 24, preferably at very high speed (on the order of 50 to 75 gallons per minute) to create vortexing if desired. The nozzles 24 are angled radially inwardly from the sidewalls 14 to provide a circumferential and a radial component to the flow of the reintroduced mixture. The nozzles 24 also have an axial component which gives the reintroduced mixture a vertical component of motion as it circulates in the tank 12. The reintroduction of the mixture through the nozzles 24 causes a rotational circulation of the mixture within the tank 12 as well as eddy-currents and other turbulence. This combination of radial, axial and circumferential components provides effective circulation of the mixture within the tank 12, maintaining a substantially homogeneous mixture in the region 22. Homogeneous means that the content of particles of all sizes is preferably substantially constant throughout the mixture.

Figure 3:
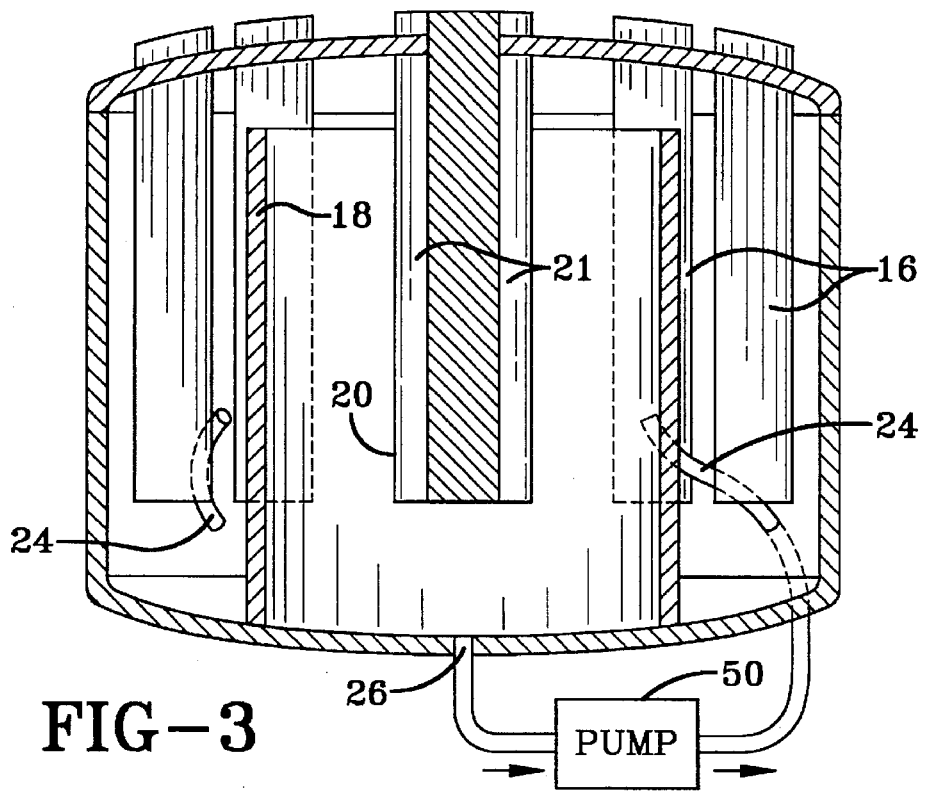
FIG. 3 is a side view in section illustrating the preferred electrochemical remediation tank of FIG. 2.

FIG. 3 is a side view in section of the tank 12 of FIG. 2. The axial component of the angled nozzles 24 is more clearly seen from this illustration, as are the grooves 21 formed in the cathode 20.

The electrochemical process which takes place in the tank 12 involves the ionization of metal particles and compounds in the mixture and the subsequent deposition of the metal ions onto the cathode 20. Metal ions have a positive charge, and it is well known that such a cation will move away from a positively charged anode toward a negatively charged cathode under the influence of an electric field. The metal cations deposit on the cathode in large numbers and form a metal coating on the cathode. The process of depositing metal cations on an electrode is known as electroplating. Control over the variables in electroplating, such as voltage density, are not explained in detail herein because a person of ordinary skill in the art of electroplating will understand how to obtain the necessary conditions for the electroplating of the metal ions once the metal particles are ionized. The voltage used in the present invention is between 0 and 10 volts and the spacing is adjustable. The power density (watts per unit of electrode surface area) depends on the size of the tank, the amount of metals in the mixture, the sizes of the electrodes and the applied potential among other variables. A person of ordinary skill in the art will understand that in order to obtain deposition of metal ions, the current must be adjusted to be above a certain threshold, which threshold is dependent upon many variables, such as the electrode material, the type of ions in the solution, the pH, etc.

In conventional electroplating processes, an anode is dissolved by the removal of electrons which frees positively charged ions, and the dissolved ions migrate under electrostatic attraction onto the cathode. However, in the present invention, the anodes 16 do not ionize and plate onto the cathode. Instead, the contaminant metal particles and compounds existing in the mixture are ionized and the ions deposit onto the cathode.

The metal atoms, compounds and particles which exist in the mixture of water, acid and contaminated earth are affected by the acidic environment throughout the entire process. The effect of the acidic environment, preferably of pH between 1 and 3, is to dissolve any soluble metals and compounds and thereby cause ionization. A second effect of the acidic environment is that it causes some of the metals clinging to particles of earth to separate. A third effect of the low pH of the mixture is that the mixture acts as an electrolyte to aid in the electrochemical process which uses an electric field. The acidic environment, in combination with the electrochemical process described below, causes the ionization of the metals so that they can be deposited onto the cathode.

As the metals (compounds and particles) circulate around the inside of the cylindrical tank 12, they impinge upon the anodes 16 located in the circulatory flow path near the inner sidewalls 14 of the tank 12. As the metals impinge upon the anodes 16, they become electrically connected to the anodes 16 making them function, for the time of contact, like a sacrificial anode in a conventional electroplating process. The contact with the positively charged anodes, in combination with the acidic environment, removes electrons from the metals to positively charge them and breaks them up into positively charged metal ions. These metal cations are then individually mobile in the mixture.

The metal cations which are released into the mixture migrate toward the cathode in a manner similar to ions in an electroplating process. There is a voltage difference between the anodes 16 and the cathode 20 producing an electric field tending to attract metal cations from the positively charged anodes 16 to the negatively charged cathode 20. The cations which are attracted to the cathode 20 permeate the metal ion permeable membrane 18 which surrounds the cathode and deposit onto the cathode in the conventional electroplating manner. The membrane 18 separates the high velocity circulating mixture from the cathode 20 in order to keep the highly abrasive particles circulating in the mixture from impinging upon the cathode 20 and mechanically removing deposited metal ions from the cathode 20 by abrasion while still permitting ions to travel to the cathode 20.

The mechanical circulation of the mixture has different effects upon the mixture. The primary effect is that the circulation maintains as homogeneous a mixture as practical to ensure that as the mixture is circulated, as much as possible of it comes into contact with the anodes. Because much of the dissolution of metal particles occurs during contact with an anode, it is desirable to cause as much contact between metal particles and anodes as is practical. Circulation greatly enhances this contact over a stagnant mixture. And because the anodes 16 are placed in the flow path of the mixture, the circulating mixture is forced through and around the anodes 16, maximizing contact between metals and anodes 16. Secondarily, circulation of the mixture promotes acidic dissolution of soluble matter and permits the metal cations to be circulated and therefore to more rapidly reach the cathode.

Experimentation involving the present invention was conducted to remove lead from contaminated earth. The apparatus used included a glass cylinder having a diameter of 5¼ inches, a height of 7¾ inches and a volume of 2000 milliliters. A single cathode made of stainless steel and 4 graphite anodes of dimension 1"×1"×10" were used in this experiment. The anodes were spaced equally from each other inside the cylinder as in the preferred embodiment. The ion permeable membrane used in the experiment was landscape fabric approximately 6 sheets thick with a mechanical spacer placed between the cathode and the anodes to hold the landscape fabric in place. The mixture was stirred mechanically. In the experiments, 1430 ml of mixture was used, and 2.5 V was applied to the cathode and the anodes. The results of the lead experiments are shown graphically in FIGS. 4 and 5. There was a 64% reduction in lead concentration within 1 hour and within about 48 hours, the lead concentration was reduced to 830 parts per billion (ppb) from 270 parts per million (ppm).

Figure 4:
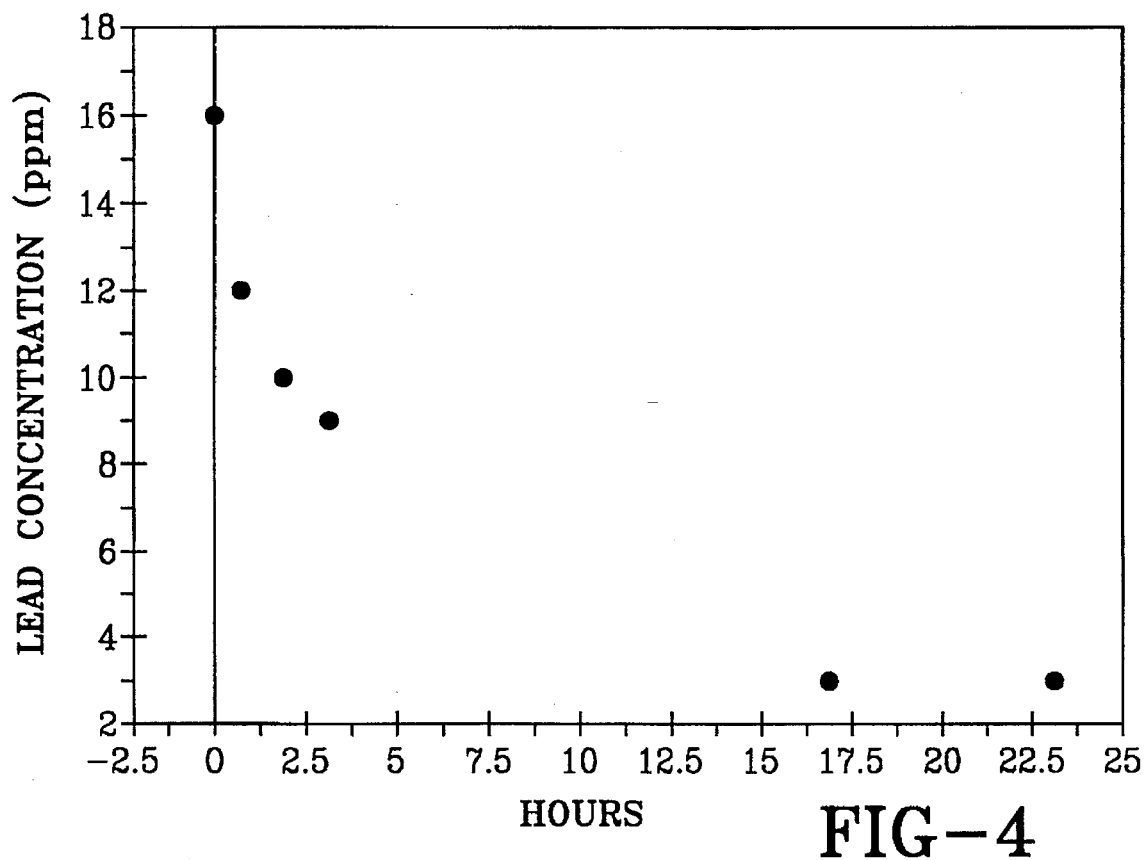
FIG. 4 is a graph illustrating experimental data.
Figure 5:
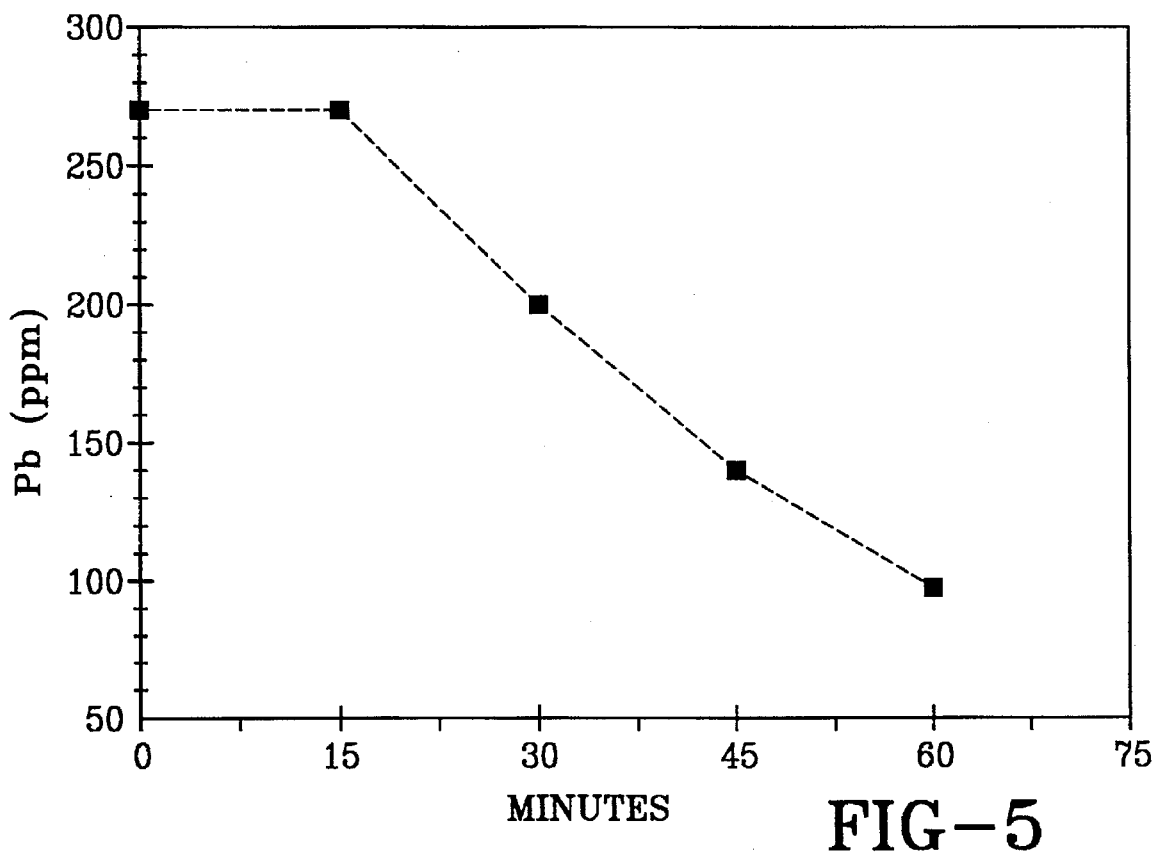
FIG. 5 is a graph illustrating experimental data.

The data shown in FIGS. 4 and 5 for lead are representative of what one would find for remediating other metals from contaminated earth. When removing other metals using the above-described electrochemical process, the voltage applied to create the electric field between the cathode and the anodes is varied based on the electrode potential of the metal desired to be removed. Since the deposition of ions existing in a solution is known in the art, a person who desires to deposit different metals would look to the literature relevant to electrodeposition to determine the voltage needed to deposit that metal. In the present process, however, this voltage must be suitable for use in combination with the mechanical and acidic properties of the soil, water and acid solution. The mechanical breakdown of the earthen matter would be known to one of skill in the art to provide as much contact between metal particles and the anodes as is practical. The variations in pH necessary for other metals depend upon the electromotive force required to ionize the metal contaminant and the solubility of the metal and its compounds. A person of ordinary skill in the art would, upon learning the matter taught herein, apply conventional principles to vary these electrochemical conditions in order to remove any metal contaminant from mixtures having various soil properties.

Figure 8:
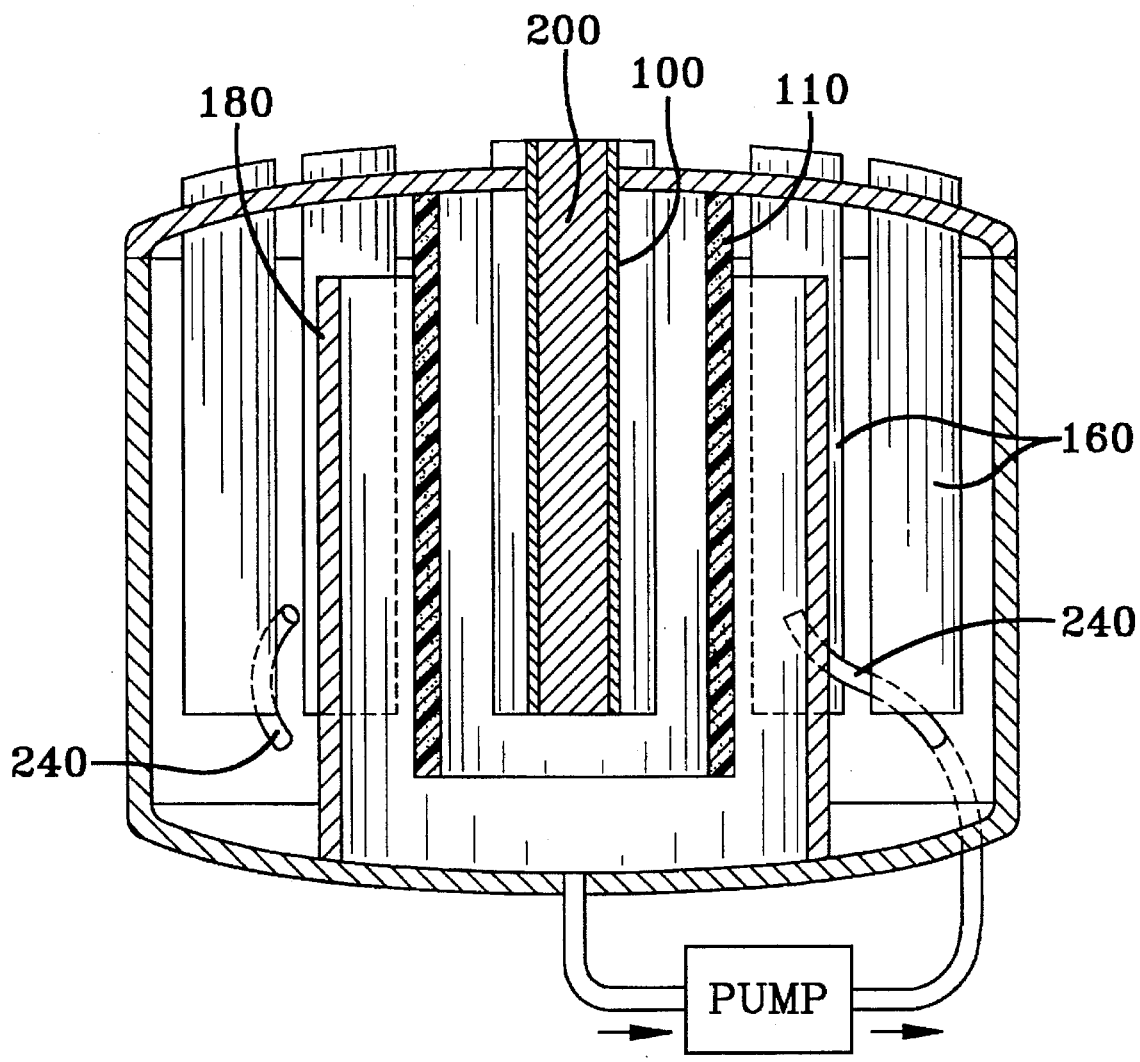
FIG. 8 is a side view in section illustrating a preferred electrochemical remediation tank.

The preferred cathode is typically 20–22 inches in outer diameter, with 4 to 5 inch deep longitudinal grooves. Approximately 1–3 inches of space is preferred between the cathode and the ion permeable membrane. The anodes, which are typically 4 inches in diameter, are preferably spaced 1–3 inches from the ion permeable membrane and 1–3 inches from the interior cylindrical tank sidewalls. The anodes are preferably made of pyrolytic graphite (although Nickel, Nickel foil, stainless steel and platinum are alternatives), and the preferred cathode is a stainless steel or plastic member 200 over which a copper foil sleeve 100, shown in FIG. 8, is removably attached. An alternative anode is Tungsten with an iridium oxide covering. Other electrode materials, shapes and configurations, although not described, are viable alternatives to those preferred.

The preferred tank for use in a larger scale operation is made of fiber reinforced plastic having dimensions of eight feet in diameter and five feet in height. The tank preferably has a permanently attached dome-shaped bottom and a removably, rigidly attached dome-shaped lid. The cathode is preferably attached to the lid and removable from the exterior of the tank (without removing the lid) enabling the operator to remove the cathode during operation, detach the removably attached copper foil sleeve, replace the foil sleeve and place the cathode back in the tank. Although these dimensions are preferred, other dimensions could be suitable for other applications. Since the preferred embodiment is designated to be transportable over long distances, the eight feet diameter and five feet height perform well in highway travel when attached to the flat-bed of a semi-tractor trailer. Furthermore, the eight feet diameter provides good homogeneity of the mixture using the fluidizing nozzles described in the preferred embodiment. As the diameter increases, the pressures necessary to circulate the mixture must increase and the potential for "dead spaces" in the circulated mixture increases.

The number of anodes may be varied, and (as a person of ordinary skill in the art will understand) a larger number of anodes will provide greater surface area on which metal particles can impinge during circulation. Up to a certain number of anodes, an increase in the number of anodes will increase the surface area and therefore increase effectiveness. The inventors have used up to 33 anodes in embodiments of the invention.

Figure 7:
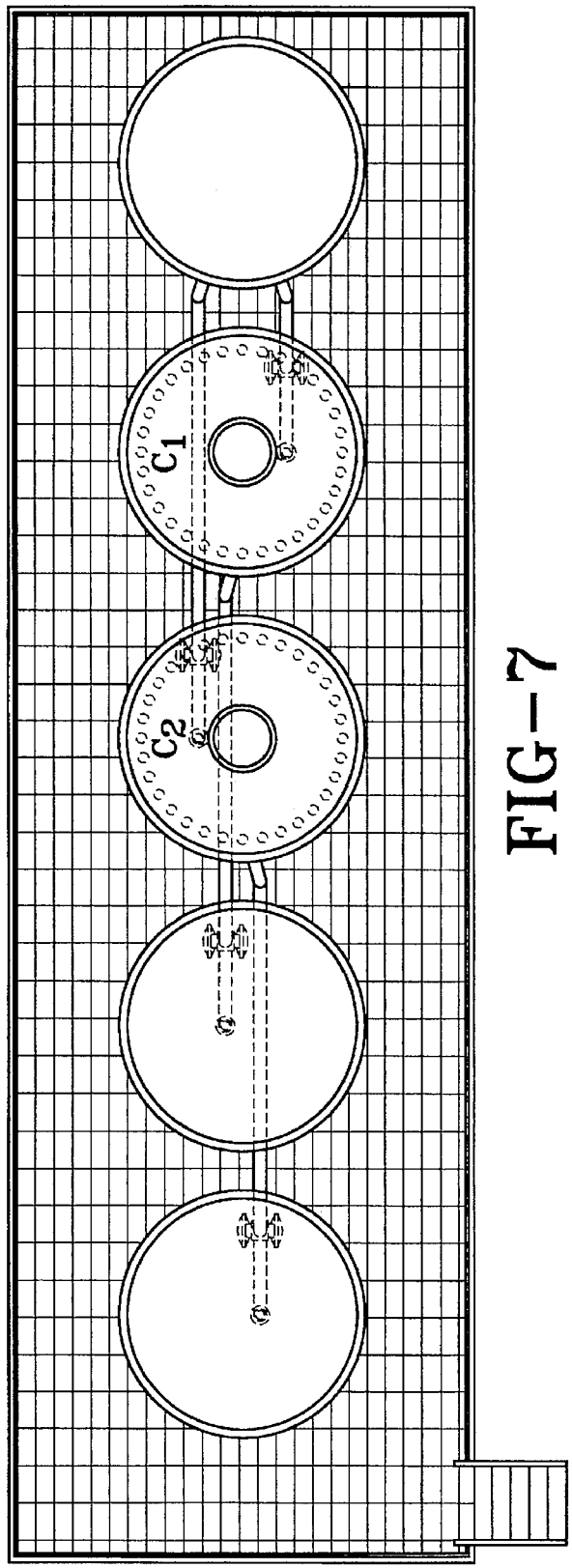
FIG. 7 is a top view illustrating the present invention as mounted in its operable position on a flat-bed truck trailer.
Figure 6:
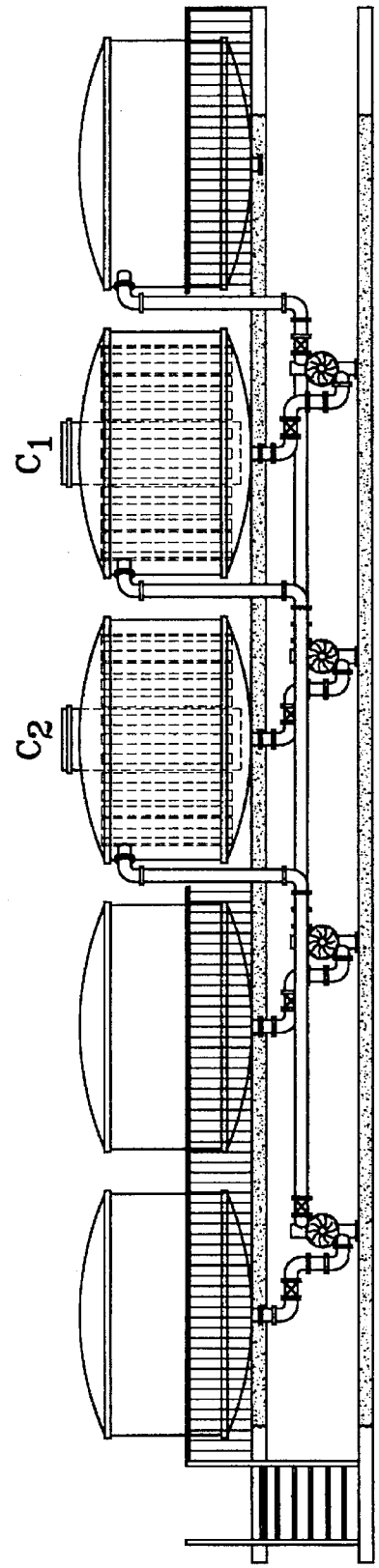
FIG. 6 is a side view illustrating the present invention as mounted in its operable position on a flat-bed truck trailer.

The preferred number of tanks is two, as shown in FIGS. 6 and 7 as tanks $C_1$ and $C_2$. The mixture is poured first into tank $C_1$ and treated. While $C_1$ is treating a mixture, tank $C_2$ is filled and treats a mixture. When the first tank completed is done, it is poured into the neutralizing tank and is refilled. In this way tanks $C_1$ and $C_2$ are arranged in parallel in an otherwise series process. This simulates a continuous process.

The nozzles 24 which recirculate withdrawn mixture back into the tank 12 are preferably 2 inches in diameter. The nozzles 24 preferably extend radially inwardly into the tank 12 between 6 and 12 inches from the interior sidewall 14 to the outer edge of the tip of each nozzle The preferred pH of between 1 and 3 is dependent upon the container and other devices exposed to the mixture, but the pH is preferably as acidic as possible within material constraints.

The time during which the mixture is circulated in the electrochemical process is between 10 and 30 minutes for most metal contaminants. Different metals have different degrees of difficulty in ionization. Furthermore, soil conditions have an effect on processing time. For most metals, 10 minutes to 30 minutes will remove a sufficient amount of the metal. However, for specialty metals, such as transuranics, 60 minutes or more may be required to remove the metal to leave only a suitable amount.

During processing of the mixture, samples are removed periodically to test the metal content remaining in the mixture. The method of measuring metal content will vary depending upon the metal to be measured. As an example, the concentration of lead in the mixture can be measured colorometrically or potentiometrically.

The present invention is designed to remove "heavy metals" from soils, clays, and other above-described matters. Examples of heavy metals include Arsenic, Barium, Cadmium, Chromium, Lead, Mercury, Selenium, Silver, Antimony, Nickel, Thallium, Vanadium, and Zinc. Since all metals are ionizable, the present invention could be used to remove any metal from natural materials, such as contaminated earth. Furthermore, a person of ordinary skill in the art would understand, based on the principles described herein, that a material which ionizes into a negative ion could also be removed using the present invention. For example, if a chemical specie which (in its ionic form) is negatively charged is to be removed, then particles containing the specie could be ionized and the specie anions would be attracted to the anode. In this case, the anode would still be positioned on the opposite side of an ion permeable membrane from the cathode, but the circulating mixture would surround the cathode instead of the anode.

The configuration of the apparatus described above with respect to the relative placement of the anodes and the cathode is the preferred configuration, but could be reversed. For example, a plurality of anodes could be positioned radially inwardly of the ion permeable membrane, and the cathode or a plurality of cathodes could be positioned radially outwardly of the ion permeable membrane. In this case, the mixture would be poured into the inside of the ion permeable membrane and circulated against the anodes so as to provide substantial contact between the mixture and the anodes.

Under some circumstances, certain metals or other chemicals which ionize will not plate onto the cathode with sufficient adhesion. In this case, a porous mass, such as a resin 110 shown in FIG. 8, is positioned between the cathode 200 and the ion permeable membrane 180. Metal ions are trapped inside the pores of the porous ion resin. Examples of materials for which the ion resin is used include Arsenic and Mercury.

While certain preferred embodiments of the present invention have been disclosed in detail, it is to be understood that various modifications may be adopted without departing from the spirit of the invention or scope of the following claims.

We claim:

1. An electrochemical remediation apparatus for removing chemicals from earth, the apparatus comprising:
   (a) a container for containing a mixture of water, acid and earth, said container having cylindrically contoured interior sidewalls;
   (b) a circulator for circulating the mixture in a flow path within the container, the circulator comprising:
      1. a recirculating pump;
      2. an outlet, connected between the pump and the interior of the container, for withdrawing a portion of the mixture from the container and transporting it to the pump; and 3. an inlet, connected between the pump and the container interior, said inlet comprising a nozzle angled relative to the interior sidewalls of the container in a direction having an axial and a circumferential component, for reintroducing into the container the portion of the mixture withdrawn from the container;

(c) a first electrode positioned in the flow path of the mixture in the container; and (d) a second electrode positioned in the container.

2. An electrochemical remediation apparatus in accordance with claim 1, wherein the first electrode is a positively charged anode and the second electrode is a negatively charged cathode.

3. An apparatus in accordance with claim 2 further comprising a selectively permeable membrane positioned in the container between the anode and the cathode.

4. An electrochemical remediation apparatus in accordance with claim 3, wherein the outlet is connected to the interior of the container radially inward of the membrane, the anode is positioned radially inward of the membrane, and the inlet is connected to the interior of the container radially outward of the membrane.

5. An apparatus in accordance with claim 3, wherein the membrane is metal ion permeable.

6. An apparatus in accordance with claim 5, further comprising a porous membrane positioned between the metal ion permeable membrane and the cathode for capturing metal ions in the pores of the porous membrane.

7. An apparatus in accordance with claim 6, wherein the porous membrane is made of a resin.

8. An apparatus in accordance with claim 7 further comprising a plurality of positively charged anodes positioned in the flow path of the mixture.

9. An apparatus in accordance with claim 8, wherein the anodes are positioned in the flow path near the cylindrically contoured sidewalls, spaced substantially equidistant from each other and substantially equidistant from the axis of the sidewalls.

10. An apparatus in accordance with claim 9, wherein the cathode is positioned near the axis of the sidewalls.

11. An apparatus in accordance with claim 10 further comprising a container cover rigidly removably attached to the container and to which the anodes and the cathode are attached.

12. An apparatus in accordance with claim 11, wherein the anodes are tungsten members with iridium oxide coverings.

13. An apparatus in accordance with claim 11, wherein a cathode surface is made of copper and the anodes are made of pyrolytic graphite.

14. An apparatus in accordance with claim 13, wherein the cathode is a stainless steel member having a removable, outer, copper sleeve.

15. An apparatus in accordance with claim 13, wherein the cathode is a plastic member having a removable, outer, copper sleeve.

16. An electrochemical remediation apparatus for removing chemicals from earth, the apparatus comprising:

(a) a container for containing a mixture of water, base and earth, said container having cylindrically contoured interior sidewalls;

(b) a circulator for circulating the mixture in a flow path within the container, the circulator comprising:

1. a recirculating pump;

2. an outlet, connected between the pump and the interior of the container, for withdrawing a portion of the mixture from the container and transporting it to the pump; and 3. an inlet, connected between the pump and the container interior, said inlet comprising a nozzle angled relative to the interior sidewalls of the container in a direction having an axial and a circumferential component, for reintroducing into the container the portion of the mixture withdrawn from the container;

(c) a positively charged anode positioned in the flow path of the mixture in the container; and (d) a negatively charged cathode positioned in the container.

17. An electrochemical remediation apparatus for removing chemicals from earth, the apparatus comprising:

(a) a container for containing a mixture of water, a chelating agent and earth, said container having cylindrically contoured interior sidewalls;

(b) a circulator for circulating the mixture in a flow path within the container, the circulator comprising:

1. a recirculating pump;

2. an outlet, connected between the pump and the interior of the container, for withdrawing a portion of the mixture from the container and transporting it to the pump; and 3. an inlet, connected between the pump and the container interior, said inlet comprising a nozzle angled relative to the interior sidewalls of the container in a direction having an axial and a circumferential component, for reintroducing into the container the portion of the mixture withdrawn from the container;

(c) a positively charged anode positioned in the flow path of the mixture in the container; and (d) a negatively charged cathode positioned in the container.

* * * * *